United States Patent [19]

Saito et al.

[11] Patent Number: 4,694,310

[45] Date of Patent: Sep. 15, 1987

[54] METHOD AND APPARATUS OF ELECTROPHOTOGRAPHY

[75] Inventors: Tutomu Saito; Hitoshi Yoneda, both of Yokohama, Japan

[73] Assignee: Kabushiki Kaisha Toshiba, Kawasaki, Japan

[21] Appl. No.: 648,819

[22] Filed: Sep. 10, 1984

[30] Foreign Application Priority Data

Sep. 19, 1983 [JP] Japan ................................ 58-172569
Sep. 19, 1983 [JP] Japan ................................ 58-172570

[51] Int. Cl.[4] ............................................ G01D 15/14

[52] U.S. Cl. .................................. 346/153.1; 346/1.1; 346/160; 355/3 R

[58] Field of Search .................. 346/153.1, 160, 160.1, 346/107 R, 108, 1.1; 355/3 R, 3 P, 3 FU, 3 CH, 3 TE, 14 E, 14 CH, 14 FU, 14 TR; 358/300, 302; 101/DIG. 13; 400/119

[56] References Cited

U.S. PATENT DOCUMENTS 2,924,519 2/1960 Bertelsen .......................... 346/135.1
3,140,175 7/1964 Kaprelian .......................... 346/153.1
4,460,907 7/1984 Nelson .............................. 346/153.1

FOREIGN PATENT DOCUMENTS 3822645 of 0000 Japan .
876577 9/1961 United Kingdom ............ 346/135.1
1463890 2/1977 United Kingdom ............ 346/135.1

*Primary Examiner*—A. Evans
*Attorney, Agent, or Firm*—Oblon, Fisher, Spivak, McClelland, & Maier

[57] ABSTRACT

A method and apparatus of electrophotography used for a printer or a copying machine, wherein a toner having no photoconductivity is applied on a surface of a photoconductive layer of a photoreceptor consisting of a transparent conductive layer and the photoconductive layer which are sequentially formed on a transparent substrate. The photoconductive layer is exposed from a side of the transparent substrate. Toner particles on an exposed region of the photoconductive layer are transferred to toner-receiving paper opposite the photoconductive layer so as to form a toner image. A process for developing a latent image can be omitted. In addition, a special toner such as a photoconductive toner having low sensitivity is not used, thereby forming a high-quality image.

11 Claims, 13 Drawing Figures

METHOD AND APPARATUS OF ELECTROPHOTOGRAPHY

BACKGROUND OF THE INVENTION

1. Field of the Invention

The present invention relates to a method and apparatus of electrophotography utilized for a printer or a copying machine and, more particularly, to a method and apparatus for forming a toner image utilizing a photoreceptor having a photoconductive layer and a toner having no photoconductivity.

2. Discussion of the Background

Electrophotography generally refers to an image-forming technique combining the photoconductive effect and the electrostatic attraction phenomenon. In each method applied to a copying machine or the like among the image forming techniques utilizing electrophotography, a developmental step is required in which an electrostatic latent image is formed on a photoreceptor and is converted into a toner image. This has prevented production of a more compact and inexpensive image-forming apparatus. Furthermore, the development step of an electrostatic latent image leads to a degradation in the picture quality due to the edge effect in which the field strength differs between the central and peripheral portions of the electrostatic latent image.

In order to solve this problem, various attempts have been made as in U.S. Pat. No. 2,924,519, Japanese Patent Disclosure (Koukoku) No. 38-22645, and Japanese Patent Disclosure (Koukai) No. 49-76531. These methods form a toner image in accordance with the following processes. First, a charged photoconductive toner is uniformly applied on a grounded electrically conductive support. The toner layer is exposed in accordance with the image density of the original object (copy) to selectively weaken the electrostatic attractive force acting between the support and toner. The toner in the exposed region with the weakened electrostaic attractive force is transferred to toner-receiving paper. Alternatively, after the toner in such a region is removed, the residual toner is transferred onto the same paper. In this manner, the toner image is formed on the toner-receiving paper.

However, with such a method, the effective sensitivity of the photoconductive toner is considerably lower than that of a photoreceptor used in other electrophotography techniques. This may be attributed to the following. First, during exposure, the light does not reach in a sufficient amount the deep region of the toner layer (i.e., the region near the support of the toner layer). Second, since the contact resistance between the toner particles is great, the charge generated upon exposure has difficulty reaching the support. If the sensitivity of the photoconductive toner is low, the density of the toner image is lowered, and fog occurs around the toner image, thus degrading picture quality. A photoconductive toner having a high sensitivity has not been proposed.

SUMMARY OF THE INVENTION

It is an object of the present invention to provide a method of electrophotography to form an image without forming a latent image and developing the latent image.

It is another object of the present invention to provide a method and apparatus of electrphotography to form an image by using a general non-photoconductive toner.

It is still another object of the present invention to provide a compact electrophotography apparatus having a simple structure.

It is still another object of the present invention to provide an electrophotography apparatus which efficiently uses a toner.

In order to achieve the above objects of the present invention, there is provided a method of electrophotography wherein a toner having no photoconductivity is applied on a surface of a photoconductive layer of a photoreceptor obtained by stacking a transparent electrically conductive layer and the photoconductive layer on a transparent substrate; and wherein the photoconductive layer is exposed from the side of the transparent substrate to transfer the toner from an exposed region of the photoconductive layer to the toner-receiving paper opposite the photoconductive layer, thereby forming a toner image. Alternatively, after the toner is removed from the exposed region of the photoconductive layer, and the toner is transferred from a non-exposed region of the photoconductive layer to toner-receiving paper to obtain a toner image in the same manner. In these continuous image-forming processes, a latent image-forming process is omitted, thereby eliminating image degradation such as the generation of a ghost caused by an edge effect occurring when the latent image is developed.

According to an embodiment of the present invention, the photoconductive layer is uniformly charged to single polarity. The toner has an insulating characteristic and is applied to the surface of the photoconductive layer after the toner is charged to a polarity opposite that of the photoconductive layer. In this case, the attractive force of the toner on the exposed region of the photoconductive layer is weakened, so that this toner can easily be transferred from the surface of the photoconductive layer to the toner-receiving paper by utilizing an electrostatic attractive froce, or so that the toner can be easily removed from the surface of the photoconductive layer.

In either embodiment, the toner does not have photoconductivity. Fog caused by use of photoconductivity toner does not occur in the toner image, thereby preventing the ghost caused by the edge effect and hence obtaining a high-quality image.

In an electrophotography apparatus of the present invention, a transparent electrically conductive layer and a photoconductive layer are stacked on a transparent substrate to constitute a photoreceptor which is moved along a predetermined direction, and a means for performing the above processes is arranged along the direction of movement of the photoreceptor. A means for transferring toner on an exposed region of the photoconductive layer to toner-receiving paper comprises an opposite electrode which is formed opposite the photoconductive layer and to which a voltage of one polarity is applied. The exposing means and the transferring means or toner-removing means are arranged to be opposite to each other with the photoreceptor interposed therebetween. Therefore, in comparison with a conventional electrophotography apparatus wherein the exposing means and the transferring means or toner-removing means are arranged at different positions along the moving direction of the photoreceptor, the space factor is improved, and the apparatus can be simplified and rendered compact in size. Furthermore, since the exposing means is separated from the toner layer, the charged toner scattered on the photoconductive layer will not be attached to the exposing means to impair the exposure state, thereby reducing the frequency of maintenance.

The electrophotography apparatus according to the present invention also preferably has a means for removing the residual toner which is not transferred onto the toner-receiving paper and remaining on the photoconductive layer, and means for conveying the removed toner to a toner-applying means, thereby allowing efficient use of a toner.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
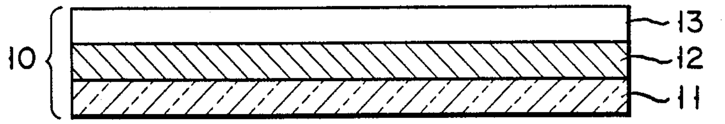
FIG. 1 is a sectional view of a photoreceptor to be used according to the present invention.

The photoreceptor 10 used in the present invention has the structure shown in FIG. 1 wherein a transparent electrically conductive layer 12 and a photoconductive layer 13 are sequentially formed on a transparent substrate 11. The transparent substrate 11 can be a glass plate or an organic material sheet. The transparent conductive layer 12 can comprise a NESA glass film, an indium oxide ($In_2O_3$) film, or the like. The photoconductive layer 13 can consist of amorphous-Se, ZnO, OPC, amorphous-Si, CdS or the like. The term "transparent" herein means optical transparency such that light of a specific wavelength used in exposure is transmitted, and does not therefore necessarily mean colorless transparency. The photoconductive layer 13 has a suitable spectral sensitivity for the wavelength of light used for exposure. The thickness of the photoconductive layer 13 is preferably smaller than that of a photoconductive layer which is used in a photoreceptor of a conventional electrophotography apparatus. When the photoconductive layer 13 consists of amorphous-Se, for example, it preferably has a thickness of about 1 to 20 μm as compared to a thickness of 50 to 60 μm of the photoconductive layer of the conventional apparatus. This is attributed to the following. When the photoconductive layer 13 is exposed with light received through the transparent substrate 11, the light must be able to reach near the surface of the photoconductive layer 13 on which the toner is attached.

Figure 2A:
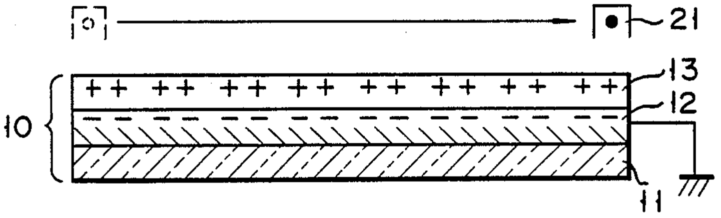
FIGS. 2A to 2D show image-forming processes according to a first embodiment of a method of electrophotography of the present invention.

Image forming processes according to a first embodiment of a method of electrophotography of the present invention will be described with reference to FIGS. 2A to 2D. First as shown in FIG. 2A, the photoconductive layer 13 of the photoreceptor 10 shown in FIG. 1 is uniformly charged to a given polarity (positive in the drawings) by a charger 21 in a dark-environment.

Figure 2B:
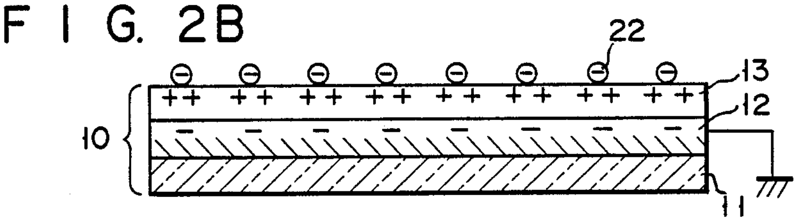

Then, as shown in FIG. 2B, toner 22 charged to the opposite polarity (negative) of that of the photoconductive layer 13 is applied on the entire surface of the photoconductive layer 13. The toner 22 is an insulating toner generally used in conventional electrophotography and does not have photoconductivity. The toner 22 can be applied by various methods such as the method of applying a charged toner with a blade, the magnetic brush method combining a powder consisting of a magnetic carrier and toner with a magnetic roller, the cascade method using a powder consisting of a toner and a relatively coarse bead-like substance, the fur brush method using a toner and a fur brush, and the powder cloud method of spraying a toner through a metal pipe and atomizing it.

Figure 2C:
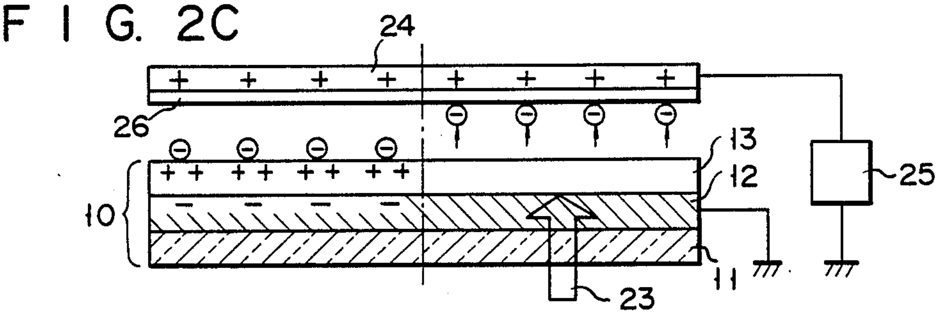

Next, as shown in FIG. 2C, light 23 corresponding to an input image is irradiated onto the photoconductive layer 13 through the transparent conductive layer 12 from the side of the transparent substrate 11, thereby making an exposure. At the same time, a voltage having an opposite polarity i.e., (positive) to that of the toner 22 is applied from a power source 25 to an opposite electrode 24 opposite the photoconductive layer 13. Then, the exposed region of the photoconductive layer 13 is rendered electrically conductive. Therefore, the charge contributing to the attractive force of the toner 22 on the exposed region of the photoconductive layer 13 is moved through the transparent conductive layer 12 and disappears. Since the attractive force on the photoconductive layer 13 is weakened, the toner on the exposed region of the photoconductive layer 13 is removed from the surface of the photoconductive layer 13 by an electric field which is generated between the transparent conductive layer 12 and the opposite electrode 24 upon application of a voltage from the power source 25. The toner is moved toward the opposite electrode 24 and is transferred onto the surface of toner-receiving paper 26 held between the photoconductive layer 13 and the opposite electrode 24. The toner-receiving paper 26 can be plain paper.

In order to allow easy removal of the toner from the exposed region of the photoconductive layer 13, the voltage from the power source 25 is preferably a pulsating voltage obtained by superposing an AC voltage on a DC voltage. The timing of the voltage applied between the transparent conductive layer 12 and the opposite electrode 24 from the power source 25 need not by synchronous with the timing of the exposure but may be applied after exposure.

Figure 2D:
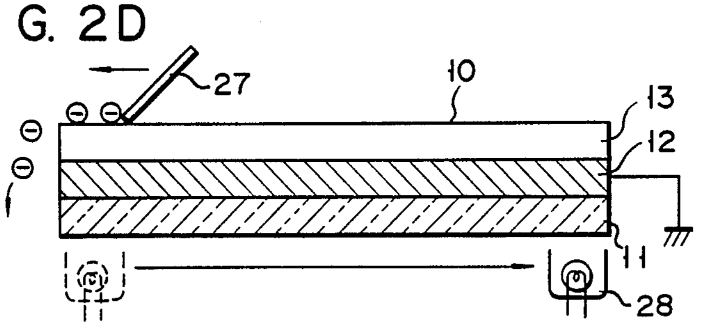

As shown in FIG. 2D, the residual toner on the non-exposed region of the photoconductive layer 13 is removed by a cleaning blade 27 and is reused. In this cleaning process, when the entire lower surface of the transparent substrate 11 is irradiated with light from a charge removal lamp 28, the charge on the photoconductive layer 13 is removed to allow removal of the residual toner on the photoconductive layer 13. The cleaning method may alternatively be a fur brush cleaning method or the like. When the removed toner is recovered in this manner, it is conveyed for reuse in another toner applying process as shown in FIG. 2B. Thus, a series of image-forming processes is completed.

Figure 3:
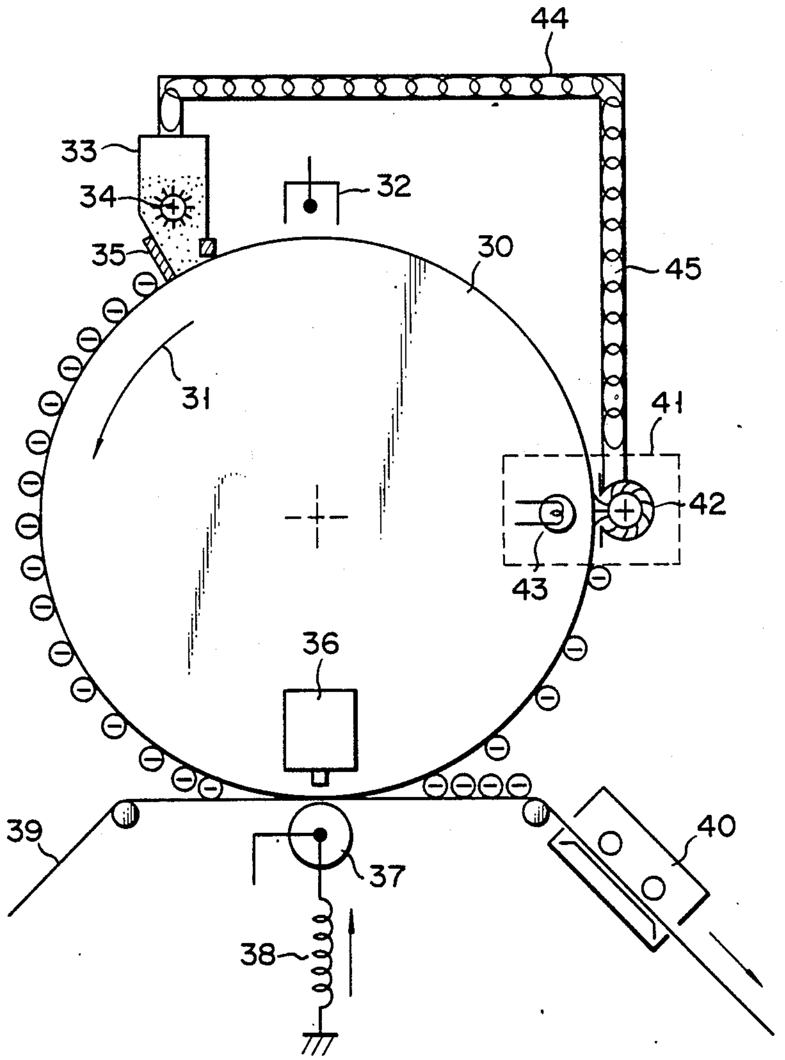
FIG. 3 shows the construction of an LED printer utilizing the image-forming processes shown in FIGS. 2A to 2D.

FIG. 3 shows an LED printer according to an embodiment of an apparatus of electrophotography utilizing the image-forming processes described above. A photosensitive drum (photoreceptor) 30 is formed in a cylindrical shape such that its photoconductive layer faces outward. A transparent conductive layer of this photosensitive drum 30 comprises, for example, a deposition film of $In_2O_3$, and the photoconductive layer thereof comprises, for example, a selenium film having a thickness of 15 μm. The photosensitive drum 30 is driven to rotate in the direction indicated by arrow 31. A charger 32, a toner applying means 33, an exposing means 36, an opposite electrode 37, and a cleaning station 41 are arranged along the rotating direction of the photosensitive drum 30 as a means which is used in the processes shown in FIGS. 2A to 2D.

The charger 32 charges the photoconductive layer of the photosensitive drum 30 to have a surface potential of about +200 V. The toner applying means 33 applies on the surface of the charged photoconductive layer by means of a blade 35 of a toner negatively charged by being stirred by a charging roller 34.

The exposing means 36 arranged inside the photosensitive drum 30 comprises an LED (light-emitting diode) array arranged linearly along the direction of the rotating axis of the drum 30, and a rod lens array for guiding light from the LED array. The exposing means 36 exposes the photoconductive layer from the transparent substrate side of the drum 30. In this case, the LED array is driven in accordance with an electrical image signal supplied from an external drive circuit. The exposing means 36 is adjusted such that the photoconductive layer is located within the focal depth of the rod lens array.

The opposite electrode 37 is located opposite the exposing means 36 with the photosensitive drum 30 interposed therebetween. In this embodiment, the opposite electrode 37 comprises an aluminum roller having a diameter of 5 mm and a conductive rubber sheet wound therearound and having a resistivity (or specific resistance) of 1,000 Ω.cm. The opposite electrode 37 is pressed by a spring 38 toward the photosensitive drum 30 through toner-receiving paper 39 at a force of 0.7 $kg/cm^2$. In this embodiment, a positive voltage, for example, about +180 V is applied to the opposite electrode 37. This voltage is preferably a voltage obtained by superposing an AC voltage on a DC voltage. Therefore, due to the electric field generated upon application of a voltage on the opposite electrode 37, the toner on the exposed region of the photoconductive layer whose attractive force is weakened upon exposure to the exposing means 36 is transferred to the toner-receiving paper 39. Thus, a toner image corresponding to the electrical image signal supplied to the exposing means 36 is formed on the toner-receiving paper 39. The toner image is fixed on the toner-receiving paper by a fixing station 40 to be an output image. The toner image thus obtained has a uniform density at a solid portion and clear printing elements in a line drawing portion. Thus, an excellent image can be obtained for various types of image patterns.

The residual toner on the photosensitive drum 30 which was not used in image formation is removed by a rotating fur brush at the cleaning station 41. A charge removal lamp 43 for radiating light onto the lower surface of the drum 30 is arranged in the cleaning station 41. The toner removed by the cleaning station 41 is guided to a conveying means 44 to be conveyed to the toner applying means 33 through a chain 45 for reuse.

Figure 4:
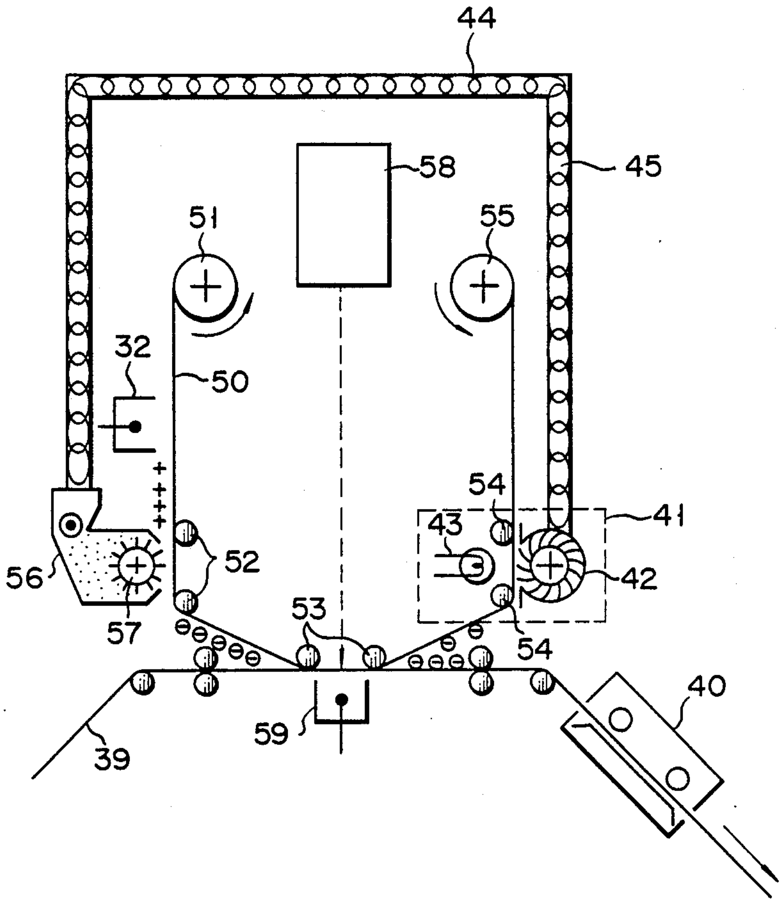
FIG. 4 shows the construction of a laser printer utilizing the image-forming processes shown in FIGS. 2A to 2D.

FIG. 4 shows an embodiment wherein the image-forming processes shown in FIGS. 2A to 2D are applied to a laser printer. In this embodiment, a web shape photoreceptor is used. The use of such a photoreceptor provides less limitations on the size of the exposure means or on the length of the optical path from the exposure means to the photoreceptor. A photosensitive web 50 comprises a polyethylene terephthalate film having a thickness of about 50 μm as a transparent substrate, a palladium film deposited thereon as a transparent conductive layer, and an Se-As-Te photosensitive material layer having a thickness of about 15 μm as a photoconductive layer. The web 50 is moved from a supply roller 51 to a take-up roller 55 at a suitable speed. At this time, a suitable tension is applied to the web 50 and is kept flat in each process by rollers 52, 53 and 54. A charger 32, a toner-applying means 56, an exposing means 58, an opposite electrode 59, and a cleaning station 41 are arranged along the moving direction of the photosensitive web 50.

The photoconductive layer of the photosensitive web 50 is charged by the charger 32 to have a surface potential of about +200 V. Then toner is uniformly applied on the photoconductive layer with the toner-applying means 56. The toner-applying means 56 adopts in this embodiment the magnetic brush method which combines a mixture of a magnetic carrier and toner, and a magnetic roller 57. The means 56 applies the negatively charged toner by friction with the carrier on the photoconductive layer. The amount of toner applied can be controlled by changing the voltage applied from a control power source (not shown) to the magnetic roller 57 within a range of, for example, +50 V to +100 V. Thus, the density of the output image can be changed as needed.

The exposing means 58 exposes the photoconductive layer applied with the toner from the side of the transparent substrate. The exposing means 58 comprises an optical system mainly having a laser diode, a polygon mirror, a scanning lens, and a peripheral circuit including a drive circuit. The exposing means 58 is adjusted such that the photoconductive layer is located within the focal depth of the optical system. The laser beam is modulated in accordance with an electrical modulation signal supplied from an external circuit and linearly scans the photoconductive layer of the web 50 using the polygon mirror and the scanning lens from the side of the transparent substrate along the perpendicular direction toward the sheet of the drawing.

The toner with the weakened attractive force toward the photoconductive layer upon exposure is transferred onto toner-receiving paper 39 by the electric field generated by the voltage applied to the opposite electrode 59 during exposure. A toner image is thus formed. The opposite electrode 59 comprises a corona charger in this embodiment. The distance from the web 50 to a corona wire of the corona charger is set to be 15 mm, and a voltage applied to the corona wire is set to be +5.5 kV. The toner image is fixed by a fixing station 40, as in the case of the embodiment shown in FIG. 3. The toner remaining on the web 50 is removed by a cleaning station 41, and the removed toner is conveyed to a toner-applying means 56 by a toner conveying means 44.

Figure 5A:
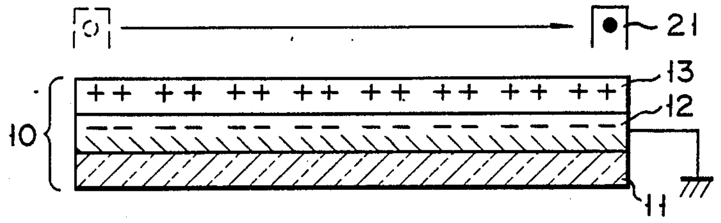
FIGS. 5A to 5D show image-forming processes according to a second embodiment of a method of electrophotography of the present invention.
Figure 5B:
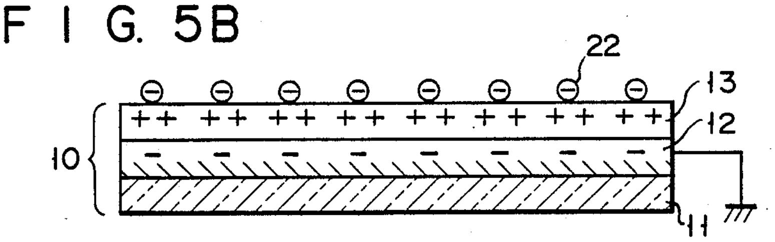
Figure 5C:
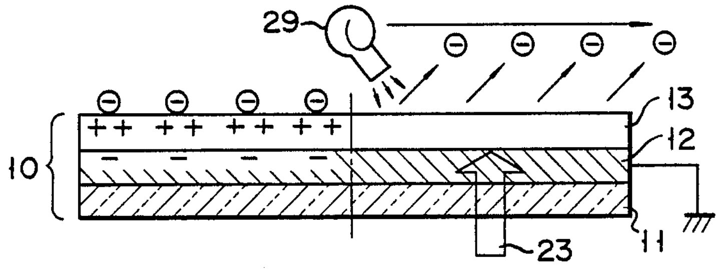

FIGS. 5A to 5D show image-forming processes according to a second embodiment of a method of electrophotography of the present invention. The processes shown in FIGS. 5A and 5B are the same as those shown in FIGS. 2A and 2B. After the process of FIG. 5B, as shown in FIG. 5C, light 23 corresponding to an input image is irradiated onto a photoconductive layer 13 through a transparent conductive layer 12 from the side of a transparent substrate 11, thereby performing exposure. Upon exposure, toner in an exposed region of the photoconductive layer 13 looses some of its attractive force. Utilizing this phenomenon, simultaneously or after the exposure, the toner on this exposed region is removed by a blower 29. In this manner, toner remains on the non-exposed region of the photoconductive layer 13. The toner may be removed by other methods such as by using a conductive roller, by combining a conductive roller and a dielectric roller, by using a dielectric film and a corona charger for charging this film, or by other methods.

Figure 5D:
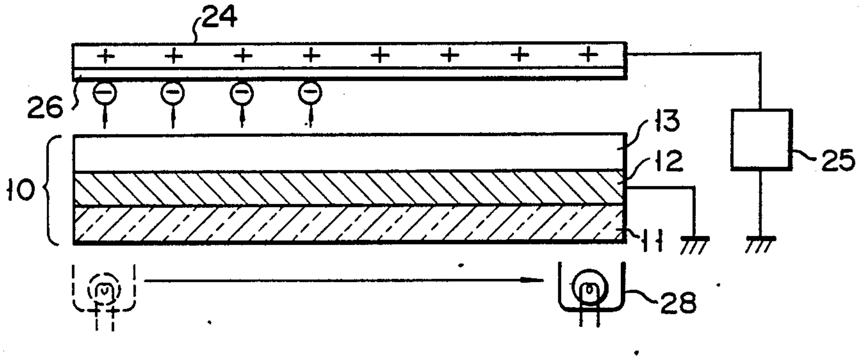

As shown in FIG. 5D, as in the process shown in FIG. 2C, a voltage having the opposite polarity as that of the toner is applied from a power source 25 to an opposite electrode 24 arranged opposite the photoconductive layer 13. Then, the toner remaining on the non-exposed region of the photoconductive layer 13 is removed from the layer 13 and is transferred to toner-receiving paper 26 held between the photoconductive layer 13 and the opposite electrode 24. When the voltage is applied from the power source 25 to the opposite electrode 24, the photoconductive layer 13 is preferably irradiated with light from a lamp 28 from the side of the transparent substrate 11 through the transparent conductive layer 12. Upon this irradiation with light, the attractive force of toner toward the photoconductive layer 13 is effectively weakened, and the transfer efficiency of the toner image is improved by about 100%. Therefore, the cleaning process after the transfer process can be omitted.

Figure 6:
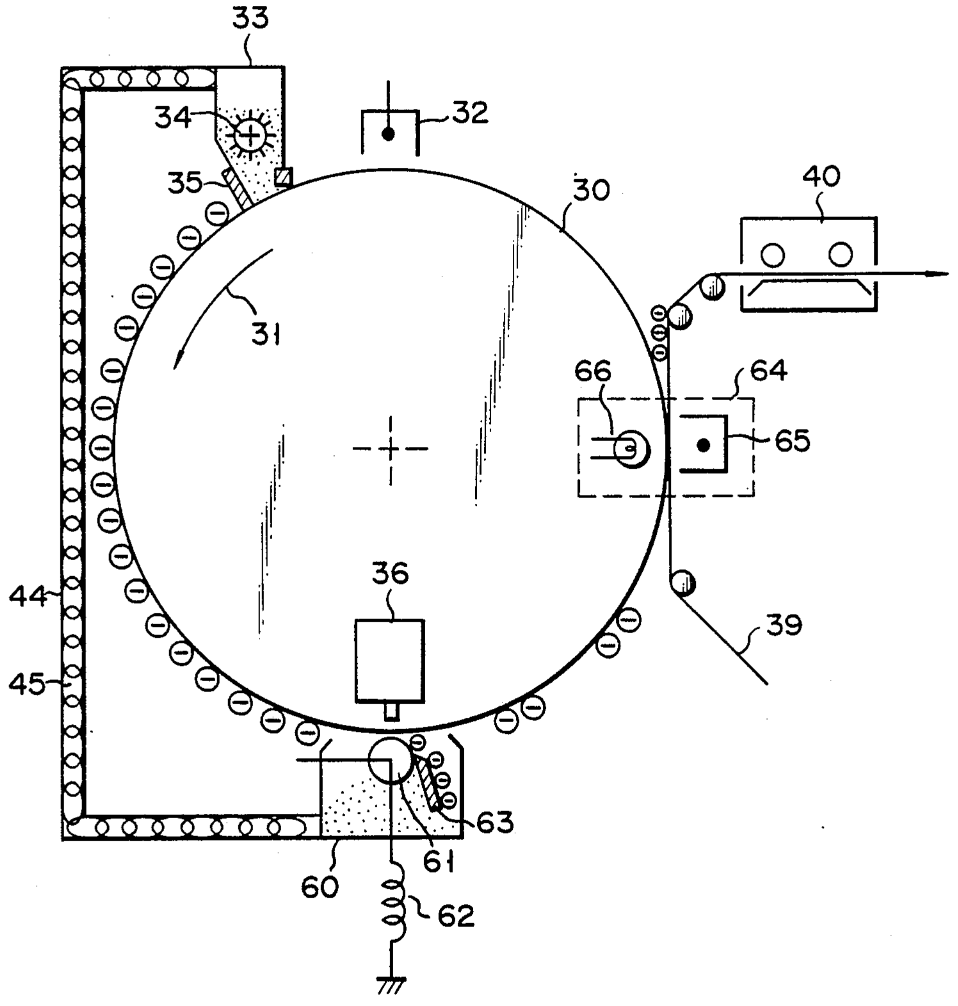
FIG. 6 shows the constuction of an LED printer utilizing the image-forming processes shown in FIGS. 5A to 5D.

FIG. 6 shows and LED printer as an embodiment of an apparatus of electrophotography utilizing the image-forming processes shown in FIGS. 5A to 5D. The primary differences between this printer and the printer shown in FIG. 3 will be described. A toner-removing means 60 is arranged at a position to be opposite to an exposing means 36 with a photosensitive drum 30 interposed therebetween. The toner-removing means 60 comprises a conductive roller 61 similar to that used in the opposite electrode 37 shown in FIG. 3, a spring 62 for pressing the roller 61 toward the drum 30 through the toner-receiving paper 39, and a blade 63. A voltage having a polarity opposite that of the toner, for example, +120 V, is applied to the roller 61. The toner on the exposed region of the photoconductive layer of the photosensitive drum 30 is attracted toward the surface of the roller 61 by the electrostatic attractive force and is removed from the surface of the roller 61 by means of the blade 63. The removed toner is conveyed to a toner-applying means 33 by a toner-conveying means 44. A transferring means 64 comprises an opposite electrode 65 and a lamp 66. In this embodiment, the opposite electrode 65 is a corona charger. The distance from the drum 30 to the corona wire of the corona charger is set to be 15 mm, and the application voltage on the corona wire is set to be +5.5 kV.

Figure 7:
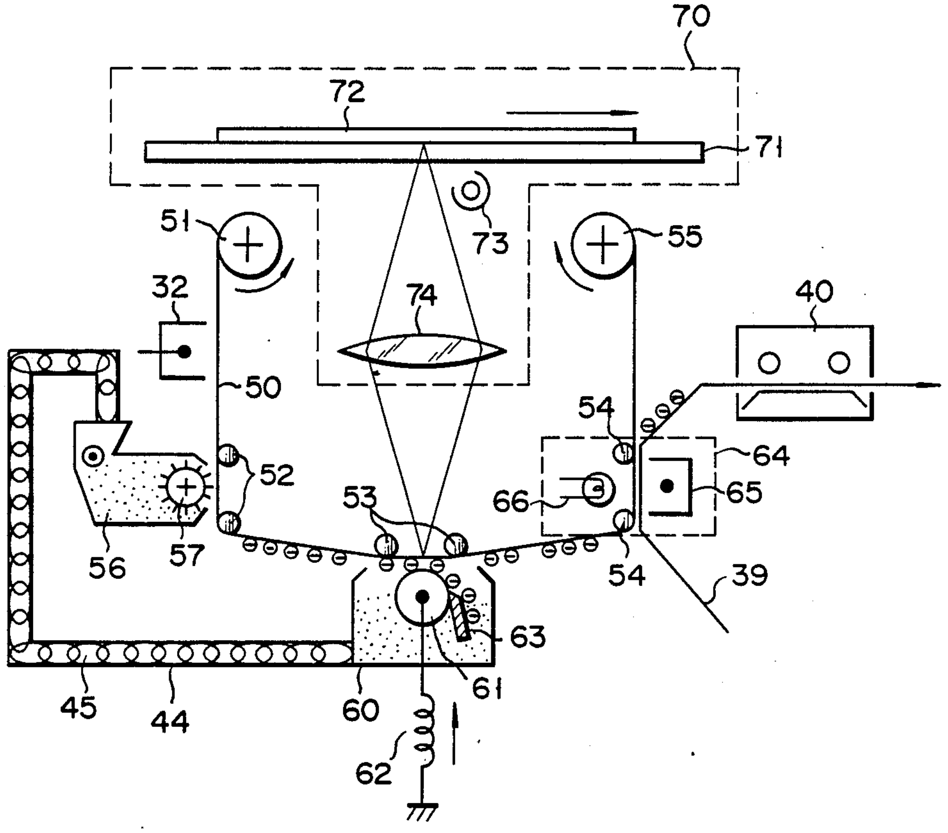
FIG. 7 shows the construction of a copying machine utilizing the image-forming processes shown in FIGS. 5A to 5D.

FIG. 7 shows an embodiment wherein the image-forming processes shown in FIGS. 5A to 5D are applied to a copying machine. In this embodiment, a photosensitive web 50 and a moving means therefor are of the same construction as that shown in FIG. 4, and the remaining structure is the same as that shown in FIG. 6 except an exposing means. An exposing means 70 is an optical system comprising a document table 71 for placing a document (original object) 72 thereon, a light source 73 for illuminating the surface of the document 72 through the document table 71, and a lens 74 for forming an image of the document 72 onto the photoconductive layer of the photosensitive web 50. The document table 71 is moved together with the web 50, so that the image on the entire surface of the document 72 is scanned and formed on the photoconductive layer of the web 50.

Obviously, numerous modifications and variations of the present invention are possible in light of the above teachings. It is therefore to be understood that within the scope of the appended claims, the invention may be practiced otherwise than as specifically described herein.

What is claimed is:

1. A method of electrophotography, which comprises:

charging a photoconductive layer, in a photoreceptor consisting of a transparent, electrically conductive layer and said photoconductive layer which is sequentially formed on a transparent substrate, with a polarity;

applying a toner charged with a polarity opposite to that of said photoconductive layer on a surface of said photoconductive layer;

exposing a portion of said photoconductive layer with said toner thereon from one side of said transparent substrate and making a charge on an exposed region of said photoconductive layer disappear through said transparent conductive layer; and transferring toner particles on the exposed region of said photoconductive layer to toner-receiving paper held between said photoconductive layer and an electrode opposing said photoconductive layer, by applying to said electrode a voltage having a polarity opposite to that of said toner.

2. A method of electrophotography, which comprises:

charging a photoconductive layer, in a photoreceptor consisting of a transparent, electrically conductive layer and said photoconductive layer which is sequentially formed on a transparent substrate, with a polarity;

applying a toner charged with a polarity opposite to that of said photoconductive layer on a surface of said photoconductive layer;

exposing a portion of said photoconductive layer with said toner thereon from one side of said transparent substrate and making a charge on an exposed region of said photoconductive layer disappear through said transparent conductive layer;

removing toner particles from the exposed region of said photoconductive layer; and transferring said toner particles from a non-exposed region of said photoconductive layer to toner-receiving paper held between said photoconductive layer and an electrode opposing said photoconductive layer, by applying to said electrode a voltage having a polarity opposite to that of said toner.

3. An electrophotographic apparatus for electrophotography, comprising:

a photoreceptor which consists of a transparent, electrically conductive layer formed on a transparent substrate, and a photoconductive layer formed on the electrically conductive layer and which is moved along one direction;

charging means opposing said photoconductive layer at a proper position, for charging said photoconductive layer with a polarity;

applying means provided downstream of said charging means in the direction in which said photoreceptor moves, for applying said toner, charged with a polarity opposite to that of said photoconductive layer, on the surface of said photoconductive layer;

exposing means, disposed in front of said applying means along the moving direction of said photoreceptor, for exposing said photoconductive layer from one side of said transparent substrate and for making a charge on an exposed region of said photoconductive layer disappear through said transparent conductive layer;

an electrode opposing said exposing means through said photoreceptor; and transferring means for applying to said electrode a voltage having a polarity opposite to that of said toner and transferring toner particles on the exposed region of said photoconductive layer to toner-receiving paper held between said electrode and said photoconductive layer.

4. An apparatus according to claim 3, wherein said exposing means further comprises means for scanning said photoconductive layer with light controlled in accordance with an electrical image signal, and for exposing said photoconductive layer.

5. An apparatus according to claim 3, wherein said voltage is obtained by superposing an AC voltage on a DC voltage.

6. An apparatus according to claim 3, further comprising:

residual-toner removing means for removing residual toner particles which are not transferred to said toner-receiving paper; and conveying means for conveying the residual toner particles removed by said residual-toner removing means.

7. An electrophotographic apparatus, comprising:

a photoreceptor which consists of a transparent, electrically conductive layer formed on a transparent substrate, and a photoconductive layer formed on the transparent, electrically conductive layer and which is moved in one direction;

charging means opposite said photoconductive layer at a proper position for charging said photoconductive layer with a polarity;

means provided downstream of said charging means in the direction in which said photoreceptor moves for applying said toner, charged with a polarity opposite to that of said photoconductive layer, on the surface of said photoconductive layer;

means provided in front of said applying means and extending in the direction in which said photoreceptor moves for exposing said photoconductive layer from one side of said transparent substrate and making a charge on an exposed region of said photoconductive layer disappear through said transparent conductive layer;

means disposed in the vicinity of said means for exposing said photoconductive layer so as to be opposite said photoconductive layer for removing toner particles from the exposed region of said photoconductive layer;

an electrode disposed in front of said means for removing toner particles and extending in the direction in which said photoreceptor moves; and means for applying to said electrode a voltage having a polarity opposite to that of said toner and for transferring said toner particles on a non-exposed region of said photoconductive layer to toner-receiving paper held between said electrode and said photoconductive layer.

8. An apparatus according to claim 7, wherein said means for exposing said photoconductive layer further comprises an optical system for forming an image of an original object on said photoconductive layer.

9. An apparatus according to claim 7, wherein said voltage is obtained by superposing an AC voltage on a DC voltage.

10. An apparatus according to claim 7, further comprising means for conveying the toner particles removed by said means for removing toner particles to said means for applying said toner.

11. An apparatus according to claim 7, wherein said means for transferring said toner particles applies the voltage to said electrode and illuminates said photoconductive layer with light from the side of said transparent substrate.

* * * * *